United States Patent [19]

Ray et al.

[11] 4,253,053
[45] Feb. 24, 1981

[54] RELUCTANCE ELECTRIC MOTOR DRIVE SYSTEMS

[75] Inventors: William F. Ray, Attenborough; Rex M. Davis, Loughborough, both of England

[73] Assignee: Chloride Group Limited, London, England

[21] Appl. No.: 890,946

[22] Filed: Mar. 28, 1978

[30] Foreign Application Priority Data

Mar. 30, 1977 [GB] United Kingdom ............ 13415/77

[51] Int. Cl.³ .............................................. H02P 7/36
[52] U.S. Cl. .................................. 318/701; 318/254
[58] Field of Search ............................... 318/254, 701

[56] References Cited

U.S. PATENT DOCUMENTS

| | | | |
|---|---|---|---|
| 3,697,839 | 10/1972 | Unnewehr | 318/701 |
| 3,714,533 | 1/1973 | Unnewehr | 318/254 |
| 3,956,678 | 5/1976 | Byrne et al. | 318/254 |

FOREIGN PATENT DOCUMENTS

2217970 10/1972 Fed. Rep. of Germany ............ 318/701

*Primary Examiner*—J. V. Trune
*Assistant Examiner*—Eugene S. Indyk
*Attorney, Agent, or Firm*—Oblon, Fisher, Spivak, McClelland & Maier

[57] ABSTRACT

In a variable reluctance electric drive system motor the fractions of a cycle during which the winding inductance of a phase increases with movement in either direction are such that the motor is self starting in either direction. The timing of the power converter in relation to the cycle of inductance is such that the current increases from its minimum value to substantially its maximum value while the winding inductance is substantially at its minimum value and thereafter substantially decreases before the power converter disconnects the winding from the supply. This can be achieved by making the switch-on and commutation of current occur at predetermined positions so related to the variation of inductance that the peak current ip at maximum power and maximum speed, is greater than I, where $I = E/(R + dL/dt)$, E is the supply voltage, R the winding resistance and dL/dt is the maximum rate of increase of inductance before the commutation point.

16 Claims, 12 Drawing Figures

RELUCTANCE ELECTRIC MOTOR DRIVE SYSTEMS

This invention relates to electric motor drive systems incorporating a variable reluctance motor having for each of n phases, where n>2, either a single winding or a main winding with an auxiliary winding closely coupled to it, and a power converter for supplying to it uni-directional current pulses from a direct voltage (D.V.) source.

An object of the invention is to improve the efficiency and/or economy of such a system. In particular in its preferred form the invention may reduce the cost of components required to produce a power output which it is to be capable of developing over a range of speeds up to a stipulated maximum.

According to one aspect of the present invention an electric drive system includes a variable reluctance motor having for each of n phases, where n>2, at least one winding whereof the inductance varies in a cycle with movement of the motor, in which the fraction of a cycle during which the winding inductance of a phase increases with movement in one direction is greater than 1/n, and the fraction of a cycle during which the winding inductance of a phase decreases with movement in the same direction is also greater than 1/n, and a power converter circuit which supplies to one winding of each phase uni-directional pulses of current from a DV source whereof the current increases from its minimum value to substantially its maximum value while the winding inductance is substantially at its minimum value, and thereafter substantially decreases before the power converter disconnects the winding from the supply (at a moment that will be referred to as the commutation point).

As described in more detail below this condition will generally be fulfilled by suitable choice of the angular positions at which switch-on and commutation of current occur in relation to the rate of rise of inductance before the commutation point.

Thus according to a further aspect of the invention an electric drive system includes a variable reluctance motor and a power converter circuit for supplying to it unidirectional pulses of current from a D.V. source, in which the reluctance motor has, for each of n phases, where n>2, at least one winding whereof the inductance varies in a cycle with movement of the motor, in which the fraction of a cycle during which the winding inductance of a phase increases with movement in one direction is greater than 1/n, and the fraction of a cycle during which the winding inductance of a phase decreases with movement in the same direction is also greater than 1/n, and in which the power converter supplies each winding with one current pulse per cycle, the switch-on and commutation of current occurring at predetermined positions so related to the variation of inductance that the peak current ip at maximum power and maximum speed, is greater than I where $I = E/(R + dL/dt)$, E is the source voltage, R the winding resistance and dL/dt is the maximum rate of increase of inductance before the commutation point.

The condition that ip>I may not be satisfied throughout the whole range of speed throughout which rated power of the motor is available but it is preferable that it should be satisfied throughout a substantial speed range from maximum speed down to a substantially lower speed, for example 75%, 50%, or even 25% of maximum speed, at maximum power for each speed. At maximum speed and maximum power the current ip may exceed 2I.

Between the portions of the cycle of rising and falling inductance the inductance may remain substantially constant at a maximum or minimum value, of which the movement corresponding to minimum inductance is preferably greater than that corresponding to maximum inductance.

The power converter may be arranged to disconnect the winding from the source, at a moment that will be referred to as the commutation point, in which case preferably the value of the current at the commutation point is appreciably less than its maximum value.

The power converter may also be arranged to provide an alternative circuit between the DV source and the winding through which winding energy may be transferred to the source after the commutation point, to collapse the current and recover energy either from the only winding of each phase, or by means of a closely coupled auxiliary winding.

After the commutation point the current may continue to fall before the inductance reaches its maximum value.

The power converter may take various known forms. The invention is however particularly, if not exclusively, advantageous if the power converter is of a type which includes for each phase winding one or two controllable solid state switching devices (S.S.S.D.) which are periodically in the 'on' state and through which the phase winding currents consequently pass and transfer energy from the D.V. source to the said winding, without passing through a capacitor.

In one arrangement the motor has one winding and two controllable SSSDs for each phase and a winding current is reduced further to its minimum value as a result of turning off both controllable S.S.S.D.'s causing the winding to transfer to two diodes which connect the winding to the D.V. source with opposite polarity thus allowing the winding to return some of its energy to the D.V. source.

In a further arrangement a single DV source is used and the motor has a main winding and a closely coupled auxiliary winding for each phase and a winding current flowing from the source to the main winding via a series connected controllable S.S.S.D. is transferred rapidly to an equivalent current in the auxiliary winding when the S.S.S.D. is turned off, the equivalent current flowing through a circuit including a diode and the D.V. source whereby the polarity of the voltage on both windings is reversed and the auxiliary winding is allowed to return some of its energy to the D.V. source while the diode conducts.

It is to be understood that where the motor includes such auxiliary windings, references herein to a phase current are generally intended to mean the sum of the current in the main winding and m times the current in the auxiliary winding where m is the ratio of the auxiliary to main winding turns.

Further features and details of the invention will now be discussed, and certain specific embodiments will be described by way of example, with reference to the accompanying drawings, in which:

FIGS. 1 to 10 (FIG. 8 comprising FIGS. 8A, 8B and 8C) are diagrammatic graphs of typical wave forms showing inductance and/or current plotted against a rotor angle or time including certain curves corresponding to known arrangements)

It will be convenient first to discuss in general terms the characteristics and functioning of variable reluctance motor drivers of the type to which the invention is applicable, comprising a variable reluctance motor and a power convertor for supplying to its windings unidirectional current pulses from a direct voltage source.

Arrangements in accordance with the invention employ at least three phases to provide adequate fractions of a cycle during which the inductance rises in a forward direction and during which the inductance rises in a reverse direction of rotation, making it practicable to design an efficient system in which the motor not only can be caused to run in either direction but will be self starting in either direction.

Thus if the motor is pictured as comprising rotor salient poles moving towards and then away from stator salient poles, it will be appreciated that it affords a number of magnetic circuits of each of which the inductance alternately increases as the poles approach one another and decreases as they recede. To produce a driving torque the attraction between the poles, and hence the current linking the magnetic circuit, should be high while the poles are approaching one another, that is to say in the range of increasing inductance where the attraction is tending to produce acceleration, and low in the range of decreasing inductance where it is exerting a braking tendency.

Thus a variable reluctance motor suited to this invention has n phases where n is greater than two and has for each phase a main winding which may be closely coupled to an auxiliary winding. A complete cycle of inductance variation for each main winding as a result of progressive motor movement comprises a portion of increasing inductance with rotor position which continues for at least 1/nth of the cycle, followed by a portion of relatively constant maximum inductance which preferably occupies much less than 1/nth of the cycle, followed by a portion of decreasing inductance which occupies at least 1/nth of the cycle followed by a portion of relatively constant minimum inductance which occupies the remainder of the cycle. By this means, in any rotor position, at least one winding has an increasing inductance enabling the motor to be started in a forward direction by causing a current to flow in that winding, and at least one winding has a decreasing inductance enabling the motor to be started in a reverse direction.

A driving torque or force is produced in the motor by applying a current to a motor phase winding during that part of its cycle of inductance variation where the inductance is increasing. The provision of the current is the function of the power converter or switching circuit which is interposed between the D.V. source and the motor windings.

The switching circuit must fulfil two functions. Firstly it must connect the D.V. source to the main winding of a motor phase in order to build up the current and supply energy to that winding. Secondly it must disconnect the D.V. source and establish a reverse voltage across the main winding in order to collapse the current and recover energy from that winding.

Known switching circuits may employ transistors and/or thyristors. The benefits of the invention relate more directly to those employing thyristors. To disconnect the D.V. source from the motor winding, the connecting thyristor may be turned off by utilising the resonant behaviour of a capacitor in series with the winding and the thyristor. The invention is however more advantageously applied to an arrangement in which a charged capacitor is connected in parallel with the conducting thyristor, thereby forcing a reverse voltage across it, by which it is turned off.

When a D.V. source of magnitude E volts is connected by a switching circuit to a winding of a variable reluctance motor having a cyclically varying inductance of L henries and of resistance R ohms, the current i amps at any instant of time t is defined by the equation $$E = Ri + L\frac{di}{dt} + i\frac{dL}{dt}$$

the instantaneous power being transferred to the rotor is $\frac{1}{2} i^2 dL/dt$ and the instantaneous gross torque developed is $\frac{1}{2} i^2 dL/d\theta$ where $\theta$ is the rotor angular displacement.

If at any instant during the increasing inductance period $E=Ri+idL/dt$ then $di/dt=0$ and the current remains constant. Thus, while the inductance increases at an approximately constant rate $dL/dt$, there is a current level I (where $I=E/(R+dL/dt)$) which the current i will asymptotically approach, or if at the commencement of the increasing inductance period the current i is equal to I then i will remain equal to I for the remainder of that period until the D.V. source is disconnected. If at the commencement of the increasing inductance period i is less than I then i will increase asymptotically towards the level I (this type of waveform being hereinafter called the flat type and used in known systems) and if at the commencement of the above period i is greater than I then i will decrease asymptotically towards the level I, (this type of waveform being hereinafter called the peaky type, used in accordance with the present invention).

For relatively small values of resistance R, I is given approximately by the equation $$I = \frac{E}{\frac{(dL)}{(d\theta)} \frac{(d\theta)}{(dt)}}$$

and hence for approximately constant $dL/d\theta$, which is dependent on the design of the motor and the resulting inductance variation with rotor position, I is inversely proportional to motor speed $d\theta/dt$.

Figure 1:
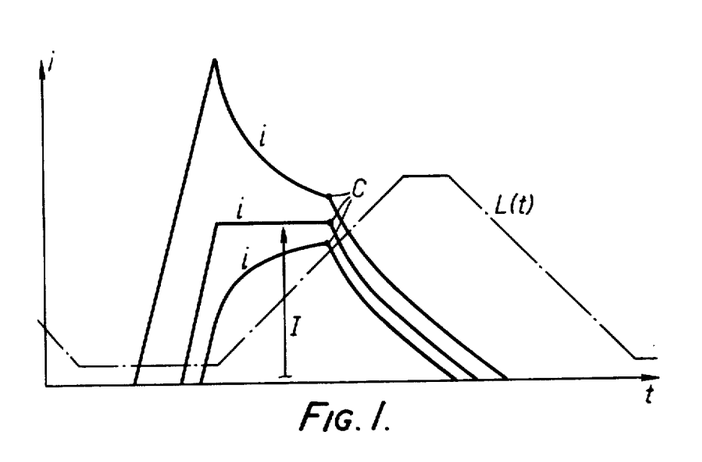

FIG. 1 illustrates typical current waveforms of the types described above. The point C shown in the waveforms, called the commutation point, is the point at which the D.V. source E is disconnected from the winding and a reverse voltage is applied either directly to the winding or by means of a closely coupled auxiliary winding such that the current i, or its auxiliary winding counterpart, is decreased to zero or to some appropriate minimum level.

For the majority of the speed range over which the motor is to operate there will only be one connection of the D.V. source to the winding and only one commutation for each cycle of winding inductance variation as illustrated in FIG. 1. During the increasing inductance period mechanical power is developed by the motor and if $dL/dt$ is approximately constant the mechanical energy developed over this period is given by $$W_1 = \tfrac{1}{2} \frac{dL}{dt} \int i^2 dt.$$

Should there be any current in the winding during the period of decreasing inductance then the mechanical energy developed over this period is also given by $$W_2 = \tfrac{1}{2} \frac{dL}{dt} \int i^2 dt,$$

and will be negative since dL/dt is negative. The total mechanical energy per phase developed for one cycle of inductance variation is given by $W = W_1 + W_2$. A negative value for W, implying that regenerative braking is taking place, will result if the current predominantly falls into the period of decreasing inductance.

Figure 2:
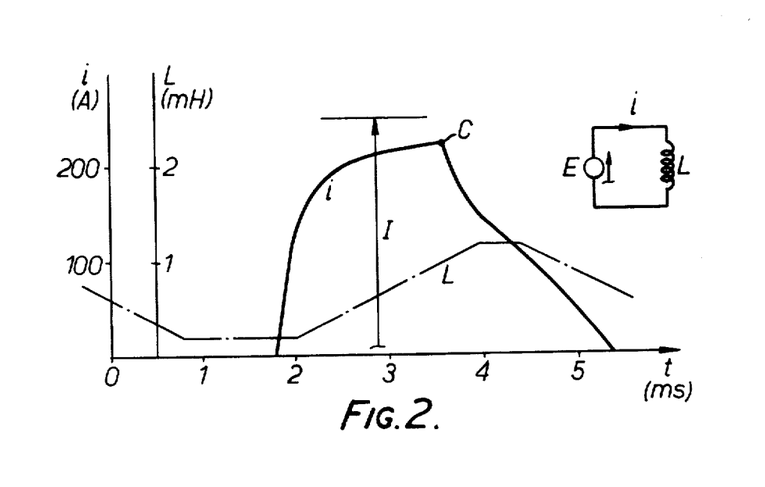
Figure 3:
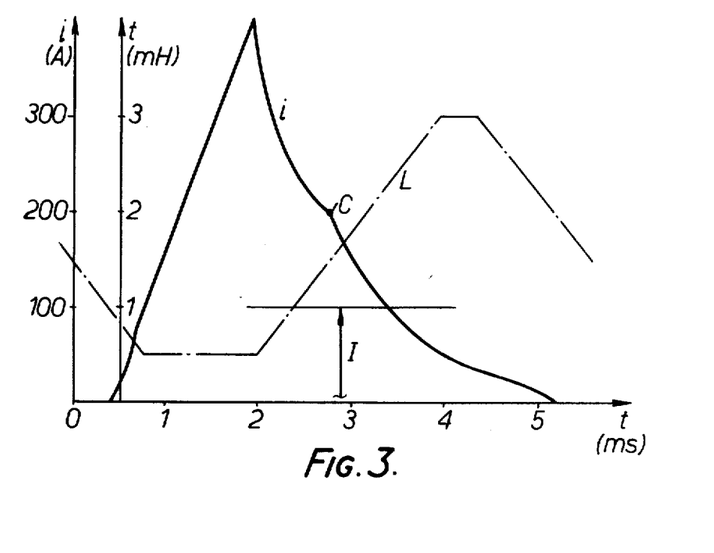

FIGS. 2 and 3 illustrate the winding current waveforms for each of two motors running at the same speed and being supplied from the same D.V. source, having the same increasing inductance period and ratio of maximum to minimum inductance for their windings, but having inductance values which are different by a factor of 2.5. Also the angular positions at which a main thyristor is fired differ so that the current wave forms give approximately the same value for $\int i^2 dt$ over the rising inductance period minus $\int i^2 dt$ over the decreasing inductance period. Thus the motor of FIG. 3 embodies the invention while that of FIG. 2 does not.

It will be seen that since I is less for the peaky type waveform, by a factor of 2.5, dL/dt is correspondingly larger by the same factor, and the power output for the peaky waveform of FIG. 3 is 2.5 times greater than that for FIG. 2.

Figure 4:
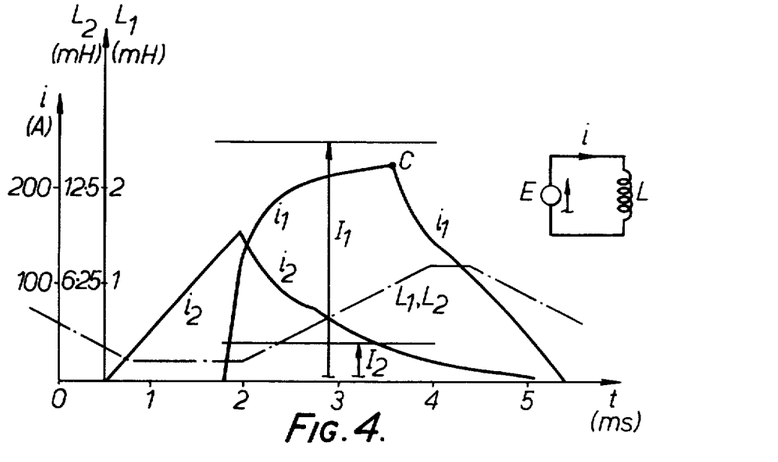

Hence in order to obtain the same power output for the peaky type waveform of FIG. 3 as for the flat type waveform of FIG. 2, and in order that $E = I \, dL/dt = 125$ V remains the same, the current values of FIG. 3 must be decreased and the inductance values increased by a factor of 2.5 as shown by the current waveform $i_2$ and corresponding inductance profile $L_2$ in FIG. 4, where the current waveform $i_1$ inductance profile $L_1$ are as in the non-preferred case of FIG. 2. It will be seen that the peaky type waveforms enable the same power output to be developed for considerably lower current values than for the flat type waveform, in particular the current at the commutation point.

In order to utilise the advantages of peaky types of current waveform to achieve a specified power output over a specified proportion of the working speed range of the motor it is necessary to have current waveforms with an increasing ratio of $i_p/I$ as the speed increases, where $i_p$ is the peak or maximum value of the current. In order to build up the current to the desired peak value $i_p$ before the winding inductance starts to increase it is preferable to have a greater proportion of the substantially constant part of the inductance profile at the minimum inductance level and a smaller proportion at the maximum inductance level as illustrated in FIGS. 3 and 4.

As the ratio of ip/I is increased the current waveform will occupy an increasing proportion of the rotor angle corresponding to a complete cycle of the phase inductance L. In FIG. 4 this angle corresponds to a period of 5.6 ms. It is advantageous, at the highest speed at which the motor is to achieve its specified power output, to make the ratio of ip/I as large as possible by making the current pulse occupy or nearly occupy the complete cycle of the phase inductance L. The current waveform i2 of FIG. 4 would therefore preferably correspond to a speed towards the top end of the range of speeds at which the motor is to achieve its specified power output.

Figure 5:
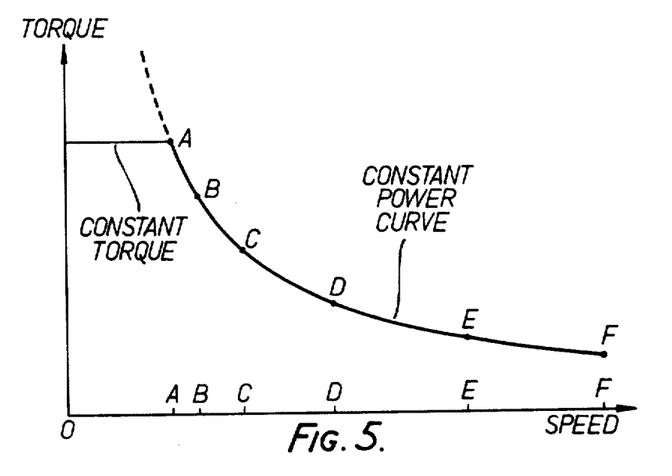
Figure 6:
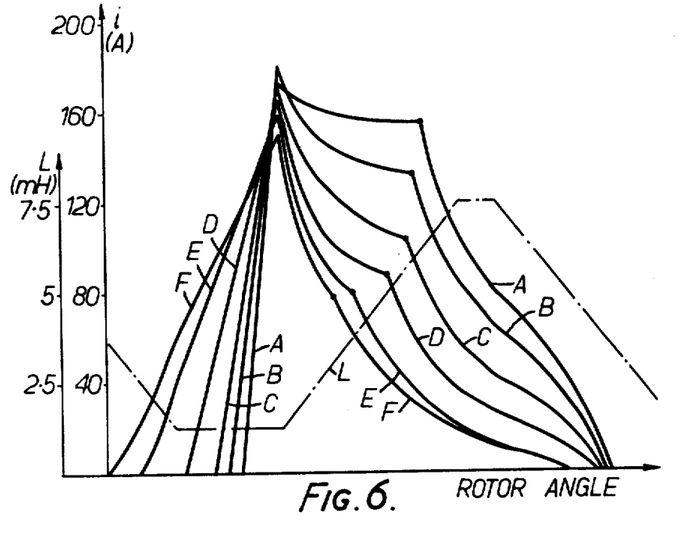

FIG. 5 shows the rated torque v. speed relationship which would give rise to a constant rated power over a range of speeds. Six speeds have been selected indicated by points A, B, C, D, E and F, and the corresponding typical current waveforms at these speeds, as related to rotor angle each giving the same power, are shown in FIG. 6. In this example case E corresponds to the current waveform 12 of FIG. 4.

The current waveforms are achieved by careful monitoring of the rotor angle and rotor speed of the motor at all instants of time by transducers of known operation, and by switching the solid state devices of the power converter circuit at the appropriate rotor angles for the prevailing speed.

It will be seen from FIGS. 5 and 6 that as the motor speed increases, the rotor angle at which the current pulse is initiated must preferably be advanced. It will also be seen that as the motor speed decreases the current waveforms become progressively less peaky. However, it is possible to utilise the advantages of the peaky type of waveform over a significant range of speeds whilst developing the specified motor power.

If at any speed within the above range less motor power is required, this may be achieved by reducing the size of the current pulse, either by delaying the point at which the current pulse is initiated, or by advancing the point at which commutation takes place, or by a combination of both.

At low speeds, for example less than point A in FIG. 5, it is not generally feasible to produce the specified motor power available at higher speeds, and generally it is required to produce a specified torque as shown in FIG. 5. At very low speeds what one may term the balancing current I is very large and the motor winding current cannot be allowed to approach this value.

Figure 7:
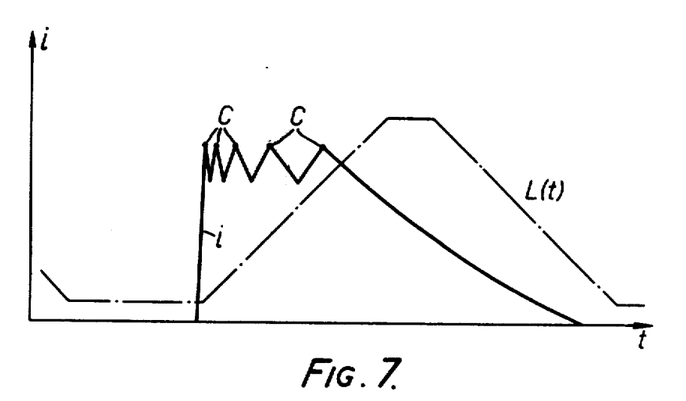

To prevent the current from becoming excessive, the winding may be disconnected from the supply when the current reaches a given value and then connected again when the current falls to a given lower value, so as to supply one or more further pulses of current. Such firing and commutation of thyristors may, or indeed must, be controlled in accordance with current in order that the current may be kept within practical limits, over a range of low speeds, indeed down to a standstill as is known per se. FIG. 7 shows a typical slow speed current waveform.

The main benefits of the peaky type waveform have been demonstrated. Firstly the current to be handled by the commutation circuit is considerably reduced thereby reducing the cost and power losses of the commutation circuit whether it utilises thyristors and a commutation capacitor or whether it utilises a transistor and an auxiliary voltage level.

Secondly the r.m.s. and average currents to be handled by the main switching devices are significantly reduced. This is also true for the low speed current waveforms (as illustrated in FIG. 7) since higher motor winding inductances are being used to enable peaky type waveforms at higher speeds illustrated in FIG. 4. If the switching devices are thyristors this gives a significant cost reduction; however if the devices are transistors, then, due to their limited peak current handling capability this benefit does not automatically ensue for the peaky type of waveform.

The third benefit of the peaky type waveform results from the fact that it extends over a larger rotor angle than for the equivalent flat type waveform and thereby currents in the n phase of the motor overlap to a greater extent and to a greater extent current that is drawn by one phase may be partly supplied by current which is being returned from another phase. This gives a reduction in the alternating component of current which is superimposed on the direct current drawn from the D.V. source. When the D.V. source is one having a significant internal resistance, e.g. a battery of secondary cells, the alternating component of current creates additional losses in the internal resistance of the D.V. source. Thus a reduction in the alternating current component yields reduced losses and higher efficiency. Capacitors, usually of the polarised electrolytic type, may be used to provide a circuit in parallel with the battery through which the alternating component of current may by-pass the battery, in which case the cost of the said capacitors is reduced if the alternating component of current they must carry is reduced, yielding an economic benefit.

A fourth benefit of the peaky type waveform is that when the commutation point is approached the current may be decreasing. Should commutation failure occur then a second attempt may be made to commutate the current in the main winding at a reduced current level.

Although the inductance profiles have been shown to be trapezoidal in FIGS. 1 to 5 for clarity of explanation, in practice they will only approximate to this shape. Furthermore it has been assumed that inductance values are solely a function of rotor position, whereas inductance is also influenced by current magnitude and the inductance profile will alter according to the degree of magnetic saturation taking place. However, the general principles which give rise to the advantages of the peaky type of current waveform still hold true. These principles also apply whether the variable reluctance motor is of a rotary or linear manufacture. In the former case a driving torque produces angular motion and in the latter case a driving force produces linear motion. In both cases there is a cyclical variation of inductance for each winding and current pulses of the aforementioned nature are used.

The objective of this invention is therefore by appropriate choice of motor winding inductance and motor geometry to realise a desirable cyclical variation of inductance and by appropriate choice of switching circuits and of the instants at which the D.V. source is connected to and disconnected from the windings to utilise current waveforms of the aforementioned nature in order to achieve a specified power output over a specified speed range with a specified D.V. source whilst minimising the cost of all components used in the system.

The present system is distinguished from other known systems by the relatively higher rate of increase of winding inductance dL/dt coupled with the relatively higher value of the aforementioned current ratio ip/I. For all full power operation, with the exception of low speeds, dL/dt and $i_p$ having values according to this invention which satisfy the condition $$i_p > I$$

where $$I = \frac{E}{R + \frac{dL}{dt}}$$

Figure 11:
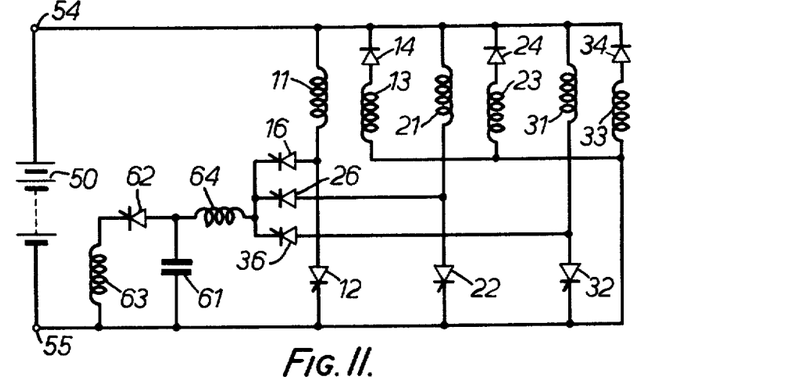
FIGS. 11 and 12 are circuit diagrams respectively of two embodiments of reluctance motor driving arrangements.

An example of a system designed and operating according to the invention will now be described with reference to FIG. 11.

The variable reluctance motor preferably less 3 or 4 phases each phase comprising a main and a closely coupled auxiliary winding. The main and auxiliary windings of a three phase motor are shown in FIG. 11 as 11, 21, 31, and 13, 23, 33. The main windings are connected sequentially to the D.V. source 50 of voltage E by firing in a sequence the main thyristors 12, 22 and 32 in synchronism with motor movement. When the time comes to turn off the main thyristor 12, for example, a commutating thyristor 16 is fired with a capacitor 61 precharged negatively. The current in the main thyristor 12 transfers to the capacitor 61 at a rate controlled by the inductor 64 and when the transfer is complete the negative voltage remaining across the capacitor 61 appears across the thyristor 12. The capacitor 61 is chosen so that the thyristor 12 is reverse biased for longer than its turn-off time. The current in the main winding 11 continues to flow through the commutating thyristor 16, the inductor 64, and the capacitor 61 until the voltage at the anode of the thyristor 12 exceeds E $$(1 + \frac{1}{m}),$$

with respect to its cathode thereby inducing a forward voltage across the diode 14 where m is the ratio of the auxiliary to main winding turns. Any further increase in capacitor voltage is accompanied by a transfer of current from the main winding 11 to the auxiliary winding 13, causing the diode 14 to conduct and fixing the auxiliary winding voltage at the value E of the D.V. source. The current in the capacitor 61 and winding 11 decays to zero while the current in the auxiliary winding 13 returns energy to the D.V. source 50 via the diode 14. As soon as the commutating thyristor 16 has regained its "OFF" or blocking state a resetting thyristor 62 may be fired thus reversing the polarity of the capacitor voltage through an inductor 63 is preparation for the next commutation.

Figure 8A:
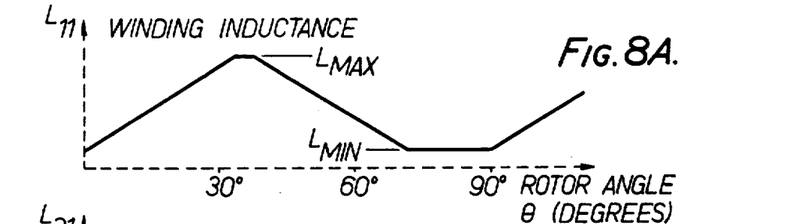
Figure 8B:
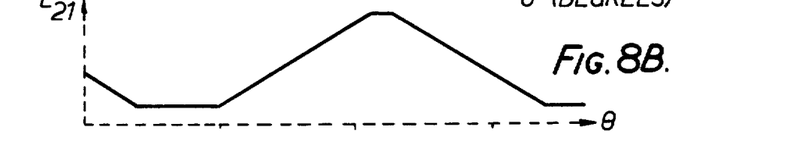
Figure 8C:
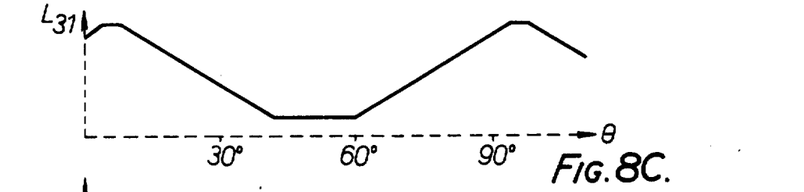

The motor winding inductance for the three main windings varies with rotor angle as shown in FIG. 8, and is consistent with a single stack motor having 6 stator poles and 4 rotor poles. For any rotor angle θ one winding exhibits an increasing inductance dL/dθ and another winding exhibits a decreasing inductance −dL/dθ. It can thus start in either direction from any position. It is assumed that the motor is designed to deliver rated power at or above a speed of N revs/s but less than a higher speed N max revs/s; the D.V. source voltage is E volts and the inductance is chosen according to the invention to satisfy the inequality:

$$(R + \frac{dL}{dt}) i_p > E$$

where $i_p$ is the peak main winding current when delivering rated power within the aforementioned speed range and R is the winding resistance and dL/dt is the maximum rate of increase of inductance before commutation. Because an important benefit of the invention is a reduction of device current ratings, the above inequality is satisfied mainly by choosing a large value for L. A limit to the size of L occurs at $N_{max}$ since the duration of the minimum inductance period during which the current can be increased to a peak value $i_p$, consistent with the development of the required power, is appreciably shorter.

Figure 9:
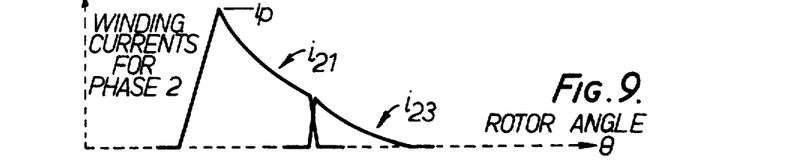

The winding current waveforms at full power and a speed of at least N revs/s are illustrated in FIG. 9; these waveforms are shown to the same horizontal axis representing rotor angle as FIG. 8. Phase 2 currents only are shown since phase 1 and phase 3 currents are indentical but advanced or delayed or 30° respectively.

Figure 10:
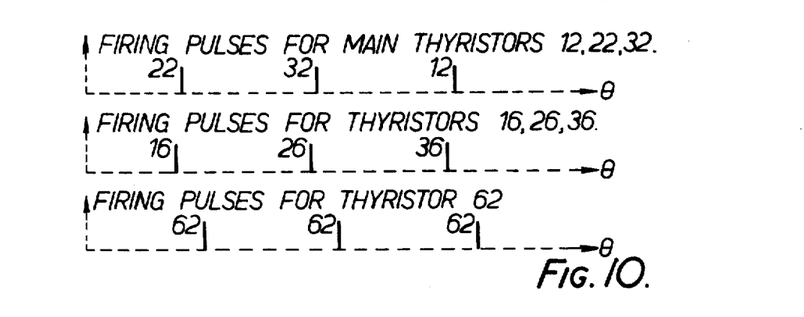

The firing pulses for all seven thyristors are shown in FIG. 10 to the same horizontal rotor angle axis.

Figure 12:
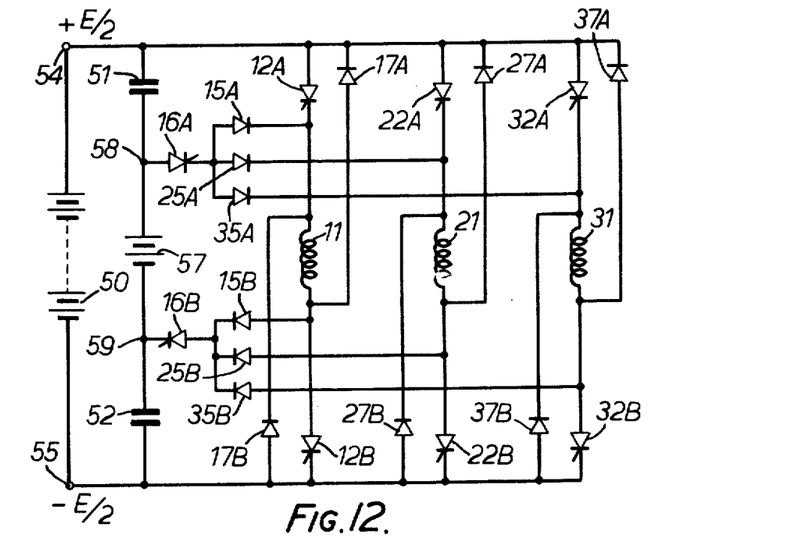

The invention is not confined to any particular form of power converter circuit and in some cases, especially for high-power high-voltage motors, it may be desirable to avoid the use of auxiliary windings to return energy to the supply. One circuit for achieving this is shown in FIG. 12.

The variation of inductance of the motor is the same as FIG. 8 but each phase now has only a single winding 11, 21 or 31. This winding is connected to the D.V. source 50 through two thyristors 12A and 12B. When the time comes to disconnect the winding 11 from the source the thyristors 12A and 12B are both turned off, simultaneously or one immediately after the other, so that the winding current now flows through diodes 17A and 17B reversing the winding polarity and allowing winding energy to be returned to the source 50.

A turn-off circuit is shown using an auxiliary source 57, two commutating capacitors 51 and 52 and two commutating thyristors 16A ad 16B. This commutating circuit may be particular to one phase, or, as shown, it may be adapted to serve all phases.

To simplify description the battery terminals are taken to have potentials with respect to a datum of E/2 and −E/2, and the auxiliary source a potential difference F.

Initially the potential at the negative terminal 59 of the auxiliary source called P 59, is equal to E/2 and hence that of the positive terminal 58 is (E/2+F). When the time comes to turn off the thyristors 12A and 12B the thyristor 16A is fired first, forcing a reverse voltage equal to F across the thyristor 12A. The main winding current transfers to the capacitors 51 and 52 through the thyristor 16A and P58 reduces from (E/2+F) to (−E/2) at which point the diode 17B conducts. P59 is now (−E/2−F) and the thyristor 16B is fired to turn off the lower thyristor 12B. The current in the winding 11 transfers from the thyristor 12B now reverse biased, to the thyristor 16B and capacitors 51 and 52 charging the capacitor 52 from (−E/2−F) to (E/2) at which point the diode 17A conducts.

Thus both thyristors have been turned off and energy from the winding 11 is returned to the source 50 via the two diodes 17.

The motor design considerations are identical to those of the previous example.

What we claim as our invention and desire to secure by Letters Patent is:

1. An electric drive system including a variable reluctance motor having, for each of n phases, where n>2, at least one winding wherein the inductance varies in a cycle with movement of the motor, in which the fraction of a cycle during which the winding inductance of a phase increases with movement in one direction is greater than 1/n, and the fraction of a cycle during which the winding inductance of a phase decreases with movement in the same direction is also greater than 1/n, and power converter circuit means for supplying to one winding of each phase uni-directional pulses of current from a DV source such that the current increases from its minimum value to substantially its maximum value while the winding inductance is substantially at its minimum value and thereafter substantially decreases to a value less than said maximum value before the power converter disconnects the winding from the supply (at a moment that will be referred to as the commutation point).

2. An electric drive system including a variable reluctance motor and a power converter circuit for supplying to it uni-directional pulses of current from a D.V. source, in which the reluctance motor has, for each of n phases, where n>2, at least one winding whereof the inductance varies in a cycle with movement of the motor, in which the fraction of a cycle during which the winding inductance of a phase increases with movement in one direction is greater than 1/n, and the fraction of a cycle during which the winding inductance of a phase decreases with movement in the same direction is also greater than 1/n, and in which the power converter supplies each winding with one current pulse per cycle, the switch-on and commutation of current occuring at predetermined positions so related to the variation of inductance that the peak current ip at maximum power and maximum speed, is greater than I, where I=E/(R+dL/dt), E is the supply voltage, R the winding resistance and dL/dt is the maximum rate of increase of inductance before the commutation point.

3. A system as claimed in claim 2 in which ip>I at maximum power for each speed throughout a range of speed from maximum speed down to 75% of maximum speed.

4. A system as claimed in claim 3 in which ip>I at maximum power for each speed throughout a range of speed from maximum speed down to 50% of maximum speed.

5. A system claimed in claim 4 in which ip>I at maximum power for each speed throughout a range of speed from maximum speed down to 25% of maximum speed.

6. A system as claimed in any one of claims 2 to 5 in which ip>2I at maximum power and maximum speed.

7. A system as claimed in claim 1 or claim 2 having a working speed range from a maximum speed down to a substantially lower speed, in which the power is substantially constant, and a lower speed range, down to standstill, in which the torque is substantially constant.

8. A system as claimed in claim 1 or claim 2 in which between the portions of the cycle of rising and falling inductance the inductance remains substantially constant at a maximum or minimum value.

9. A system as claimed in claim 8 in which the movement corresponding to minimum inductance is greater than that corresponding to maximum inductance.

10. A system as claimed in claim 1 or claim 2 in which the power converter is arranged to provide an alternative circuit between the DV source and the winding through which winding energy may be transferred to the source after the commutation point.

11. A system as claimed in claim 10 in which the energy is recovered from the only winding of each phase.

12. A system as claimed in claim 10 in which the energy is recovered by means of a closely coupled auxiliary winding.

13. A system as claimed in claim 1 or claim 2 in which, after the commutation point, the current continues to fall before the inductance reaches its maximum value.

14. A system as claimed in claim 1 or claim 2 in which the power converter is of a type which includes for each phase winding one or two controllable solid state switching devices (S.S.S.D.) which are periodically in the 'on' state and through which the phase winding currents consequently pass and transfer energy from the D.V. source to the said winding, without passing through a capacitor.

15. A system as claimed in claim 14 in which the motor has one winding and two controllable SSSD devices for each phase, and a winding current is reduced further to its minimum value as a result of turning off both controllable S.S.S.D devices causing the winding current to transfer to two diodes which connect the winding to the D.V. source with opposite polarity thus allowing the winding to return some of its energy to the D.V. source.

16. A system as claimed in claim 14 in which a single DV source is used and the motor has a main winding and a closely coupled auxiliary winding for each phase and a winding current from the source to the main winding via a series connected controllable S.S.S.D is transferred rapidly to an equivalent current in the auxiliary winding when the S.S.S.D. is turned off, the equivalent current flowing through a circuit including a diode and the D.V. source whereby the polarity of the voltage on both windings is reversed and the auxiliary winding is allowed to return some of its energy to the D.V. source while the diode conducts.

* * * * *